United States Patent Office 3,356,933
Patented Dec. 5, 1967

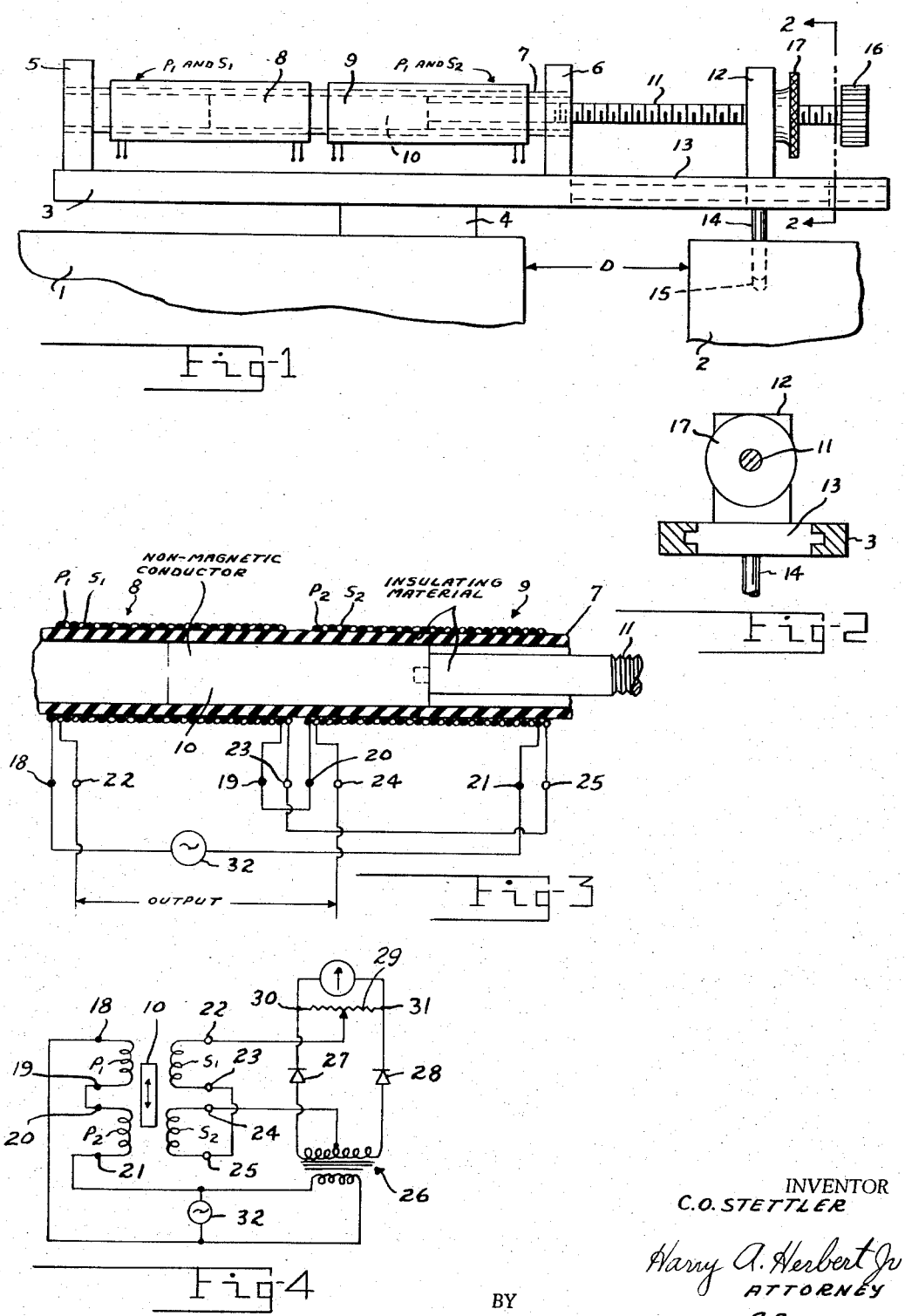

3,356,933
DISPLACEMENT SENSOR COMPRISING DIFFERENTIAL TRANSFORMER WITH NONMAGNETIC CORE
Clifford O. Stettler, Chicago, Ill., assignor to the United States of America as represented by the Secretary of the Air Force
Filed Oct. 27, 1964, Ser. No. 406,949
1 Claim. (Cl. 323—51)

ABSTRACT OF THE DISCLOSURE

A displacement sensor of the movable core differential transformer type for use under conditions of high temperature and nuclear radiation comprising a ceramic tube on which are wound two adjacent sets of single layer bifilarly wound primary and secondary windings, the two primary windings being connected in series aiding relationship and the two secondaries being connected in series opposing relationship. A movable core made of a nonmagnetic conductive material such as brass or aluminum is positioned within the ceramic tube.

---

This invention relates to transducers for converting a mechanical displacement into a corresponding electrical signal. In particular, it relates to transducers that are basically differential transformers with movable cores for controlling the relative couplings between primary and secondary windings. Such transducers usually employ ferromagnetic cores. As a result they are not suitable for use at temperatures that exceed the Curie temperature of the ferromagnetic material. Also, they are not suitable for use where subjected to nuclear radiation which has an effect on the ferromagnetic material similar in many ways to high temperature. Accordingly, it is the principal purpose of this invention to provide a displacement sensor that can be used under conditions of temperature and radiation far in excess of those tolerable with a device employing ferromagnetic materials. Further objects are to provide a displacement sensor having good sensitivity, a low impedance so that high voltages and resulting arcing are avoided, good linearity and a relatively large measurement range.

Briefly the sensor in accordance with the invention comprises two adjacent pairs of windings, each pair consisting of bifilarly wound primary and secondary windings. The two primaries are connected in series in phase aiding relationship to form the primary winding of a differential transformer and the two secondary windings are connected in series in phase opposition to form the differential transformer secondary. A core made of a nonmagnetic conductor, such as brass or aluminum, and movable axially of the windings controls the coupling between the primary and the two secondaries differentially. When the core is equally divided between the two secondaries the couplings to these windings are equal and the net output is zero. An increase in the core penetration of one secondary winding and a corresponding decrease in the other causes a decrease and an increase, respectively, in the primary couplings to these windings, resulting in a net output voltage the amplitude of which indicates the magnitude of the core displacement and the phase of which relative to the primary phase indicates the direction of core displacement. The effect of the core on the couplings between the primary and secondary windings is due to the eddy currents in the core which affect the mutual inductances between the primary and secondary windings. It will be noted that the effect is opposite to that obtained with a magnetic core since, with a magnetic core, the secondary containing the greater part of the core would have the greater voltage induced in it.

The invention will be described in more detail with reference to the accompanying drawing in which:
FIG. 1 is an elevation of a displacement sensor in accordance with the invention;
FIGS. 2 and 3 are sectional views of FIG. 1; and
FIG. 4 illustrates the use of a phase sensitive detector with the sensor to obtain a direct current signal therefrom.

Referring to FIG. 1 a displacement sensor in accordance with the invention is shown as used to sense variations in the distance D between two bodies 1 and 2. The sensor comprises a base 3 attached to body 1 by member 4. Two upright members 5 and 6 support a tubular form 7 of suitable insulating material such as a ceramic on which are wound pairs of coils 8 and 9. Pair 8 consists of primary winding $P_1$ and secondary winding $S_1$. The turns of these windings are wound side by side in bifilar fashion as better seen in FIG. 3. Similarly, pair 9 consists of bifilarly wound primary $P_2$ and secondary $S_2$.

A cylindrical core 10 of the nonmagnetic conductor such as brass or aluminum is slidably contained in the tube 7. Attached to core 10 is a threaded rod 11 of a suitable insulating material such as a ceramic. This rod engages threads in upright member 12 the base 13 of which slides freely in a track provided in base 3, as better seen in FIG. 2. Sliding member 12 engages body 2 in any suitable manner, as by a pin 14 which extends into hole 15. For any given initial value of D, within the range of the sensor, core 10 may be adjusted to the null position, i.e., the position in which it is equally contained in the two secondaries $S_1$ and $S_2$, by turnng knob 16 on the end of threaded rod 11. A locking nut 17 may be provided to lock the core in this position.

The manner in which the four windings are electrically connected is illustrated in FIGS. 3 and 4. Windings $P_1$ and $P_2$ are connected in aiding relationship, i.e., so that the fluxes produced by these windings are additives. Secondaries $S_1$ and $S_2$ are connected in opposition so that the output voltage at terminals 22–24 is equal to the difference between their voltages. When core 10 is in its null position, which is the position in which the voltages induced in the secondaries are equal, the output of the sensor is zero. A displacement of core 10 toward winding $S_2$, for example, reduces the primary to $S_2$ mutual inductance and increases the primary to $S_1$ mutual inductance, causing the voltage induced in $S_1$ to exceed that induced in $S_2$. This results in a net output voltage at terminals 22–24 the amplitude of which is directly related to the amount of the core displacement and the phase of which, relative to the primary phase, indicates the direction of the displacement.

Where a direct current output signal is desired a phase sensitive rectifier may be employed with the sensor, as shown in FIG. 4. The rectifier comprises transformer 26 with center tapped secondary, diode rectifiers 27 and 28, and load resistance 29. The operation of these circuits is well understood in the art. The direct voltage between terminals 30–31 is zero when the voltage at terminals 22–24 is zero since the rectified voltages across resistor 29 are equal and opposite in polarity. In the presence of a sensor output, however, the output adds to the transformer 26 secondary voltage in the case of one rectifier and subtracts in the case of the other so that the direct currents in the two halves of resistor 29 are unequal and a net voltage appears between terminals 30–31. The magnitude and polarity of this indicate the amount and direction, respectively, of the core 10 displacement from its null position.

The sensitivity and linearity of a sensor of the above described type depend principally upon the frequency of the energizing A.C. source 32 and the diameter of the core, the sensitivity being directly related to each of these parameters. The bifilar arrangement of the windings also provides for good linearity over a relatively wide range of core positions.

I claim:

A displacement sensor for use under conditions of high temperature and nuclear radiation comprising: two parts capable of relative motion along a straight line; a tube of a ceramic material mounted on one of said parts with its axis parallel to said line of motion; a first primary winding and a first secondary winding bifilarly wound on said tube; a second primary winding and a second secondary winding bifilarly wound on said tube adjacent to said first windings; a core within said tube movable in either direction from a null position in which the length of core within said first windings equals the length within said second windings, said core being made of a conductive nonmagnetic material; a mechanical connection of insulating material between said core and the other part of said sensor whereby relative movement of said parts moves said core relative to said windings; means connecting said primary windings in series aiding relationship; means for energizing said primary windings with alternating current; a pair of output terminals; means connecting said secondary windings in phase opposition between said output terminals.

References Cited

UNITED STATES PATENTS

| | | | |
|---|---|---|---|
| 2,325,279 | 7/1943 | Schaper | 323—90 X |
| 2,427,866 | 9/1947 | MacGeorge | 323—45 X |
| 2,568,587 | 9/1951 | MacGeorge | 336—136 |
| 3,205,485 | 9/1965 | Noltingk | 340—196 |
| 3,210,746 | 10/1965 | Clapp | 340—199 |
| 3,286,145 | 11/1966 | Silver | 318—31 |

JOHN F. COUCH, *Primary Examiner.*

W. E. RAY, *Assistant Examiner.*